United States Patent Office 3,232,274
Patented Feb. 1, 1966

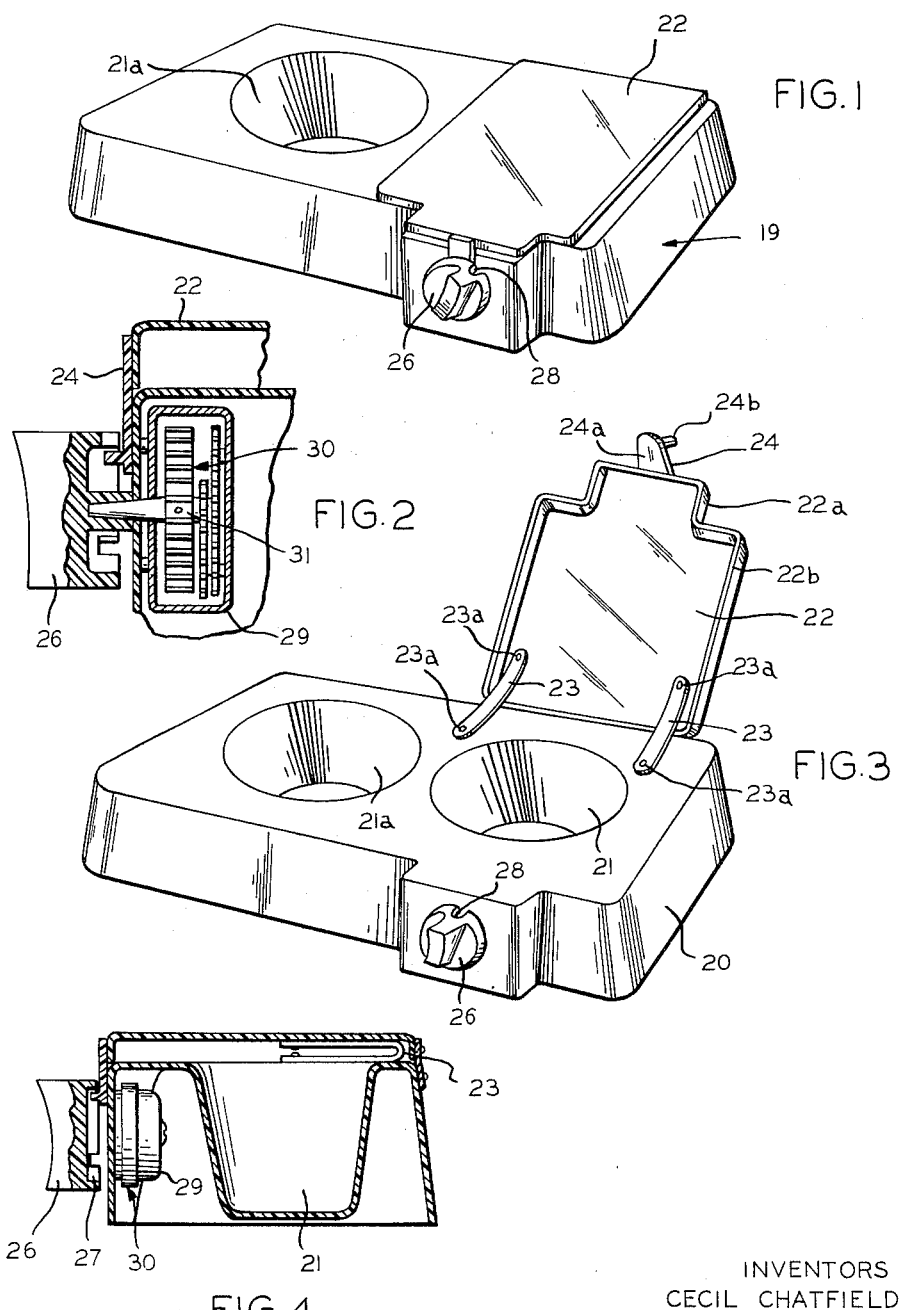

3,232,274
TIME RELEASED PET FEEDING DEVICE
Cecil Chatfield and Richard Chatfield, both of 3524 N. 15th St., Milwaukee, Wis.
Filed Sept. 9, 1964, Ser. No. 395,206
1 Claim. (Cl. 119—51.12)

Our invention relates to pet feeding devices and more particularly to a device that is time controlled.

It is manifest to anyone familiar with feeding pets of various types, that they are prone to eating the food as soon as it is set before them, and it is difficult to train them to eat their rations at the proper or accustomed time. It is also a known fact that at times it is necessary to leave the pet, such as a dog, or the like, confined for a length of time, and it is therefore a prime object of our invention to permit the owner of the pet to prepare the food and water in advance and have it ready for serving at a predetermined time for the benefit of the pet.

An object of our invention is to provide a device that will retain pet food in edible condition until ready to be eaten by pets.

Another object of our invention is to provide a device of the character described that may be set for service at a predetermined time.

Still another object of our invention is to provide a pet feeding device which is simpler in construction than our earlier devices and which will accomplish the objects stated herein.

Other and further objects of the invention will become more apparent as the description proceeds when taken in conjunction with the drawings in which:

FIG. 1 is a pictorial view of our new and improved pet feeding device.

FIG. 2 is a partial, sectional view illustrating the relationship of our timer means and lock knob with our pet feeding device, FIG. 3 is an isometric view of our pet feeding device illustrating it in its open position, and FIG. 4 is a sectional view of our pet feeding device illustrating the timer means and lock knob retaining the cover of our device in its closed position.

Referring to the drawing wherein similar characters of reference indicate corresponding parts throughout the several views, our pet feeding device 19 includes a body 20, which is preferably hollow and integrally molded of a thermal plastic material. The body has a pair of indentations 21 and 21a formed at the top thereof as illustrated in FIG. 3. A flat cover 22 is sized to cover one of the feeding indentations 21 and is pivotally associated with the body 20. The cover has an opened position (FIG. 3) and a closed position (FIGS. 1 and 4). The cover has an edge sealing means 22b projecting therefrom for sealing the feeding indentation 21 when covering same in its closed position. Spring means 23 are associated with the cover 22 and body 20 by the fastening means 23a for biasing the cover 22 to its open position. The cover has a latch means 24 depending from it, and said latch means is disposed adjacent to said body when the cover is in its closed position over one of the indentations as illustrated in FIGS. 1 and 4.

A timed lock knob 26 is pivotally associated with the body 20 of the pet feeding device 19; and a timer device 31 is associated with the lock knob 26 to rotatably actuate the same a preselected distance in a preselected time. As seen from FIGS. 2 and 4, the timed lock knob 26 is disposed to retain the latch means 24 for a preselected time and thereafter, release said latch means to enable the cover 22 to be moved to its opened position by the spring biasing means 23.

The timed lock knob 26 has an inner annular groove 27 for retaining the latch means by being in contact with a finger portion 24b, which projects transversely outward therefrom. The timed lock knob has a finger opening 28 communicating with the inner annular groove so that the timed lock knob can initially receive the finger portion 24b and can retain the finger portion 24b in all positions of the knob except its open position where the finger opening 28 is directly above the finger. When the finger opening 28 is directly above the finger, the latch means is then released as above described.

It will be seen that any type of timer device for rotatably actuating the timed lock knob 26 can be utilized and any well-known expedient can be used in its place. In the preferred embodiment the timer device rotates to a certain extent at which point it rings a bell 29 and the cover is released to its opened position.

In operation, the pet feeding device is utilized to store food by having food placed in the indentation which has a cover associated therewith. The cover is then placed to its closed position, and the latch means is disposed with its finger portion, in contact with the annular groove of the lock knob by initially being moved through the finger opening 28 and rotating the lock knob a certain extent so that the finger opening is no longer in alignment with the finger 24b of the latch means. The lock knob is then caused to rotate by the timer device back to its open position where the finger opening is directly above the finger of the latch means whereupon the cover is released and biased to its opened position while a bell from the timer device rings to enable a pet to gain access to the food receiving indentations. In our preferred embodiment, the distance that the timer device is rotated after the finger of the latch means is placed into contact with the timed lock knob, determines the amount of time that must elapse for the top to be released.

Accordingly, we have provided a device which is simple in construction and highly efficient for the purpose for which it was intended. In our preferred embodiment, we only show one cover and one timing device. However, the same device could be employed with another cover with respect to another indentation in the pet feeding device. Therefore, although we have shown a specific construction and arrangement of the parts, we are fully cognizant of the fact that many changes may be made in the shape, form, and configuration of the parts without affecting their operativeness and we reserve the right to make such changes as we may deem to be necessary without departing from the spirit of our invention or of the scope of the claim.

What is claimed is:

A pet feeding device comprising: a body, at least one feeding indentation formed at the top of said body, a flat cover being sized and disposed to cover said feeding indentation, said cover being pivotally associated with said body and having an open and a closed position, spring means associated with said flat cover and body for biasing said cover to its open position, said flat cover having a latch means depending from said cover and being disposed adjacent said body when said cover is in its closed position over said indentation, said latch means having a finger projecting transversely outward therefrom, a timed lock knob rotatably associated with said body, and a timer device associated with said lock knob to rotatably actuate the same a preselected distance in a preselected time, said timed lock knob being disposed to retain said latch means for a preselected time and thereafter release said latch means to enable said flat cover to move to its open position, said timed lock knob having an inner annular groove and finger opening communicating with said inner annular groove, said inner annular groove of said lock knob retaining said latch means by initially receiving the finger of said latch means through said finger opening and thereafter having the lock knob rotated a preselected distance so that the finger opening is no longer in alignment with said finger, said timer device rotatably actuating said lock knob back to a position where said finger opening is aligned with said finger, whereby said cover can be positioned in its closed position over said indentation and retained in said position for a preselected time by having said annular groove contact said finger of said latch means and by having said timer device rotate said knob until said finger opening thereof is directly above said finger whereupon said cover moves to its open position.

References Cited by the Examiner

UNITED STATES PATENTS

| | | | |
|---|---|---|---|
| 2,157,682 | 5/1939 | Sweeny | 119—63 |
| 2,528,742 | 11/1950 | Coffing | 119—51.12 |
| 2,752,995 | 7/1956 | Dodge | 119—51.12 |
| 3,137,272 | 6/1964 | Lepper | 119—51.12 |

SAMUEL KOREN, *Primary Examiner.*

ALDRICH F. MEDBERY, *Examiner.*